Figure 1:
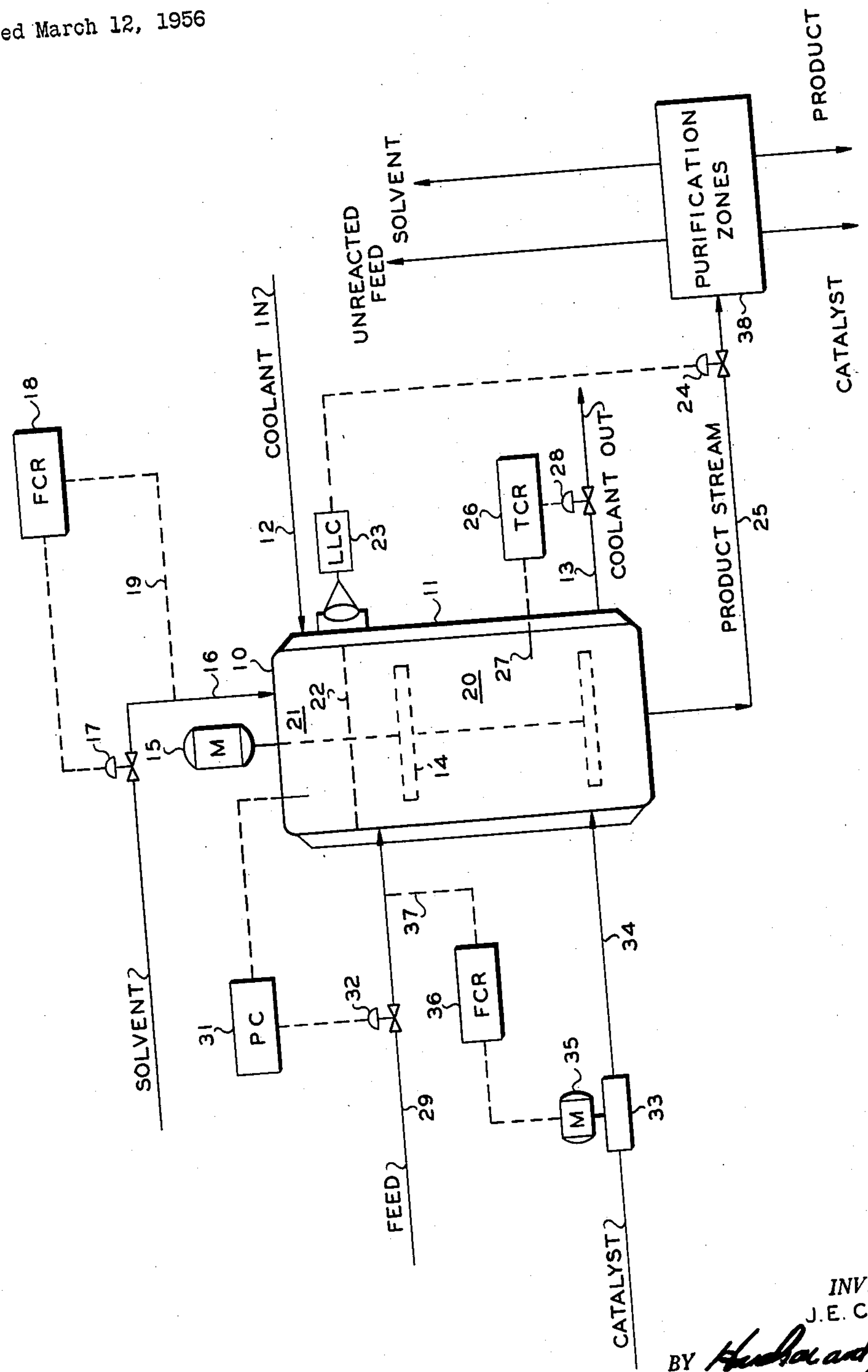

Dec. 13, 1960

J. E. COTTLE 2,964,511

CONTROL OF CATALYTIC PROCESSES

Filed March 12, 1956

2 Sheets-Sheet 1

F/G. 1

INVENTOR.
J. E. COTTLE

BY Hudson and Young

ATTORNEYS

CONTROL OF CATALYTIC PROCESSES

Filed March 12, 1956 2 Sheets-Sheet 2

INVENTOR.
J. E. COTTLE
BY Hudson and Young
ATTORNEYS

United States Patent Office 2,964,511

Patented Dec. 13, 1960

2,964,511

CONTROL OF CATALYTIC PROCESSES

John E. Cottle, Bartlesville, Okla., assignor to Phillips Petroleum Company, a corporation of Delaware Filed Mar. 12, 1956, Ser. No. 570,742

10 Claims. (Cl. 260—94.9)

This invention relates to a method of controlling a catalytic process. In another aspect, it relates to apparatus for the control of process variables in a catalytic reaction. In one of its more specific aspects, this invention relates to the control of a catalytic process in a reactor having a vapor phase and a liquid phase. In another of its more specific aspects, it relates to the control of the polymerization of ethylene.

In many catalytic reactions, the effective control of the process variables of time, temperature, pressure, and concentration is of utmost importance since not only yield, but also the physical properties of the final product are affected thereby. This is particularly true of catalyzed polymerization reactions. In addition to the above named variables, a fifth variable which must often be considered is catalyst activity. In processes in which catalyst is fed to the reactor and removed with the reactor product, other process variables can be affected considerably by changes in catalyst activity which can be caused, for example, by the increase of catalyst poisons in the system. Therefore, a satisfactory control of these interrelated variables has been a serious problem in catalyzed reactions. While temperature can be held constant, the other variables of pressure, concentration, overall catalyst activity, and residence time of the materials in the reactor must be controlled while making allowance for the effect that each variable has upon the other. Thus, it is with the control of these process variables in a catalytic reaction that this invention is primarily concerned.

I have found that a liquid phase catalytic reaction carried out in a gas-cap reactor can be advantageously controlled to insure a substantially constant concentration of reaction product in the reactor and obtain a uniform reaction product by varying the catalyst feed rate as a function of the pressure within the reactor. Further advantages are realized by making the catalyst feed rate dependent upon the reactant feed rate which in turn is varied as a function of the pressure within the reactor. Accordingly, I have found a method and apparatus for effecting this type of control. By a "gas-cap" reactor, I refer to a closed reactor having a liquid phase with a vapor phase above the liquid phase in the reactor.

I have also found that a liquid phase, ethylene polymerization with a chromium oxide containing catalyst in a gas-cap reactor can be effectively controlled by maintaining all variables constant except the ethylene feed rate which is varied in response to changes in the pressure within the reactor, thereby to maintain said pressure substantially constant. In some polymerization processes, it is necessary to use a relatively impure monomer feed. This results in an accumulation of gaseous impurities in the vapor phase of the reactor causing an increase in pressure therein. Such a development would defeat the purpose of my above-described invention since the monomer concentration would continue to decrease; however, I have found a modification which overcomes this problem by venting the vapor phase of the reactor and controlling the flow rate of the vent gases as a function of the monomer concentration in these gases, thereby to maintain a substantially constant monomer concentration in the vapor phase of the reactor.

It is an object of this invention to provide an improved method for controlling a liquid phase catalytic reaction.

It is another object of this invention to provide an improved control system for such a reaction.

It is still another object of this invention to provide a method of controlling an ethylene polymerization process in a reactor having a liquid phase and a vapor phase.

It is still another object of this invention to provide a method of controlling a polymerization reaction in which the monomer feed is relatively impure.

Figure 2:
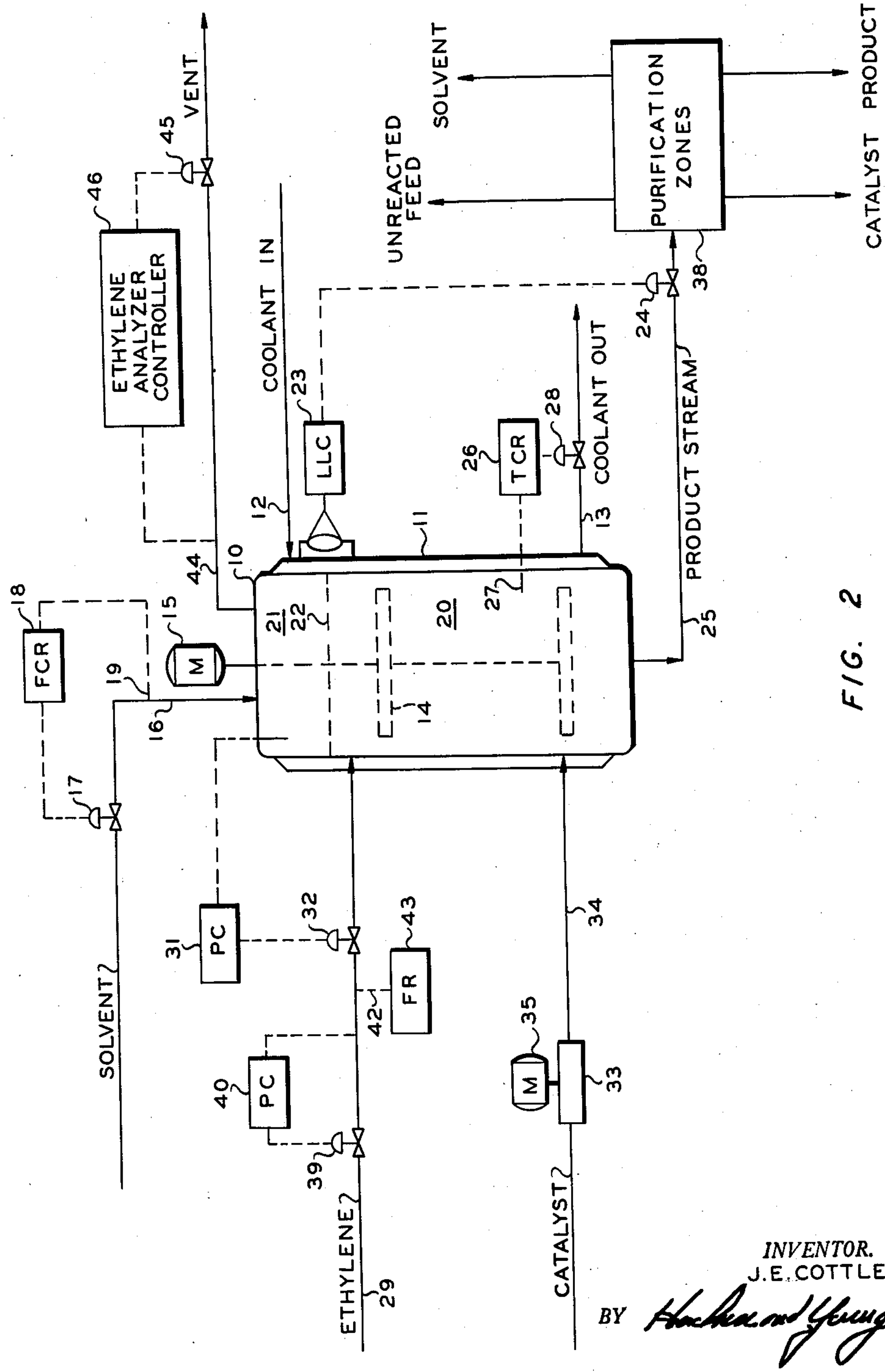

Various other objects, advantages, and features of the invention will become apparent from the following detailed description taken in conjunction with the accompanying drawings in which:

Figure 1 is a flow diagram of a process embodying the control system of this invention; and Figure 2 is a flow diagram of a process with a modification of my control system for the polymerization of ethylene.

While this invention can be applied advantageously to any liquid phase catalytic process which utilizes a closed reactor having a liquid phase and a vapor phase, it is of particular advantage in polymerization reactions, such as the polymerization and copolymerization of polymerizable olefins, especially aliphatic and cycloaliphatic olefins, preferably 1-olefins including both mono- and diolefins, for example, butadiene, and the like. Among the examples of the preferred class of products are homopolymers of ethylene, propylene, 1-butene, 1-pentene, and the like, and copolymers of ethylene with propylene, 1-butene or butadiene, and the like. In a preferred embodiment of this invention, aliphatic 1-olefins with a maximum chain length of 8 carbon atoms and no branching nearer the double bond than the four-position are polymerized in the presence of a catalyst comprising chromium, a substantial portion of which is hexavalent (preferably at least 0.1 percent by weight of the total catalyst) as chromium oxide associated with at least one oxide from the group consisting of silica, alumina, zirconia, and thoria. The total chromium content is preferably between 0.1 and 10 weight percent. Polymerization is ordinarily carried out at a temperature between 150 and 450° F. The olefin is preferably polymerized in a hydrocarbon solvent such as naphthenic hydrocarbons and paraffinic hydrocarbons of from 3 to 12 carbon atoms, for example, isooctane and cyclohexane. The effluent withdrawn from the reactor comprises a solution of polymer in solvent; and when slurry or suspended catalyst is used, the solution also contains catalyst. Unreacted olefin is removed by flashing; and the solution with or without the addition of more solvent is filtered to remove the catalyst. The catalyst-free polymer solution is then passed to suitable recovery steps for removal of the solvent.

In order that a uniform product be produced, reactor residence time, temperature and pressure must be kept substantially constant. Since catalyst activity is subject to variance, this invention provides a method of control which will compensate for such variations in catalyst activity and permit the control of other variables to produce a uniform product at a substantially constant rate. Basically, this invention serves to maintain the variables of such a process substantially constant. In the discussion to follow, while variables are described as remaining constant, it should be understood that slight changes are necessary in order to stimulate the control systems associated therewith:

(1) Temperature is maintained constant by regulating the flow of a heat exchange medium;

(2) Solvent addition rate is held constant;

(3) The withdrawal stream from the reactor is controlled to keep a constant liquid level within the reactor;

(4) Pressure within the reactor is maintained constant by varying the reactant feed rate; and (5) Catalyst feed rate is varied with changes in catalyst activity in order that the process will require a substantially constant reactant feed rate.

Variations in catalyst activity cause changes in reaction rate resulting in pressure fluctuations in the vapor phase of the reactor. These pressure fluctuations in turn cause adjustments to be made in the reactant feed rate and appropriate compensations in the catalyst feed rate are then effected.

Referring now to Figure 1, I have shown a reactor 10, which is provided with a jacket 11, having a coolant inlet conduit 12 and outlet conduit 13. Agitation is provided in the reactor by agitator 14 which can be of any type well known in the art, as for example, a propeller or turbine agitator. Agitator 14 is driven by motor 15. Suitable solvent, such as cyclohexane, is fed to the reactor through conduit 16, controlled by valve 17, which is actuated by flow controller recorder 18 in response to the flow measurement, as determined by flow sensing element 19. The flow rate of solvent is set at a predetermined level in order to maintain the required residence time of the reactants in the reactor.

Within the reactor 10 is a liquid phase 20 and a vapor phase 21, separated by interface 22. The liquid phase comprises solvent, reactant feed, reaction product, and catalyst. The vapor phase comprises reactant and some solvent in the vapor state. The liquid level in the reactor is maintained constant by liquid level controller 23, which may use any level sensing device such as a float or a dielectric probe. Liquid level controller 23 is operatively connected to valve 24 in product stream conduit 25, so that flow from the reactor is increased or decreased as necessary to maintain vapor liquid interface 22 at a constant level.

Temperature of the liquid in the reactor is maintained constant by temperature controller recorder 26 connected to temperature sensing element 27 in contact with liquid phase 20, and controlling valve 28 in the coolant outlet conduit 13.

The reactant feed, which is monomer in the case of polymerization, enters the reactor by conduit 29. Pressure of the vapor phase in reactor 10 communicates with pressure controller 31 having a pressure sensing element which produces an output proportional to this pressure. This output is applied in pressure controller 31, which in response thereto controls valve 32 in feed conduit 29, thereby regulating the flow of feed to the reactor in compensation for changes of pressure within the vapor phase of the reactor.

Catalyst is fed to the reactor by catalyst feeder 33 through conduit 34. Any suitable solids feeder, as for example a star valve, may be used for feeder 33. Catalyst feeder 33 is driven by motor 35 equipped with a suitable speed controller. Catalyst can be introduced by any other suitable means, such as in a solvent dispersion through a motor valve having a flow controller. In the system illustrated, flow controller recorder 36 adjusts the otherwise constant speed of motor 35 in response to an output of flow sensitive element 37 in feed conduit 29, which output is a function of the flow rate through conduit 29. As an alternative to the above-described arrangement, the catalyst flow rate can be controlled directly by pressure controller 31. This can be done while varying the reactant feed rate of flow as described or while holding it constant and allowing the necessary adjustment to be brought about by varying the catalyst feed rate alone. The system illustrated is preferred, however, because of the dampening effect realized thereby.

Reactor product is withdrawn through conduit 25 and flows under the control of valve 24 to suitable purification zones 38 where unreacted feed, catalyst, and solvent are separated and returned, if desired, to the reaction zone, and the final product is withdrawn from the system.

To further clarify the operation of my invention, a specific example will be discussed in connection therewith. In this example, the catalyzed reaction is the polymerization of ethylene with a granular chromium oxide-silica-alumina catalyst.

Ethylene of about 90 weight percent purity (a blend of fresh ethylene and recycle) is fed to an agitated reactor at a sufficient rate to maintain a reactor pressure of 500 pounds per square inch absolute. Methane and ethane are the principal impurities in the ethylene, and it is substantially free of oxygen, carbon monoxide and water which are common catalyst poisons. The coolant flow is adjusted to maintain a reaction temperature of 285° F. The flow controller 18 is set to maintain sufficient solvent flow for a reactor residence time of 4 hours. Initially, the catalyst rate is set to maintain a concentration of about 0.3 weight percent of catalyst in the reactant effluent. Under these conditions, the reactor effluent contains 7.5 weight percent ethylene polymer and 5 weight percent unreacted ethylene. As an example of the interaction of the various controls of my invention, let it be assumed that the catalyst in the reactor exhibits a small decrease in activity. This drop in activity tends to decrease the rate of polymerization in the reactor, and since less ethylene is being polymerized, the reactor pressure begins to rise. This rise in pressure is communicated to pressure controller 31, which acts upon valve 32 to reduce the flow of ethylene in conduit 29. This reduction of ethylene flow rate causes a responsive output from flow sensitive element 37 to flow control recorder 36, which acts to increase the speed of motor 35, thus, increasing the rate of catalyst flow through the feeder 33 and conduit 34. The increased catalyst rate increases the catalyst concentration which gradually acts to reduce the reactor pressure by increasing the polymerization rate. A signal in response to the reduced pressure is transmitted through pressure controller 31 to restore the ethylene feed rate to its original value. The reactor operation will thus reach equilibrium with an increased catalyst feed rate, thus compensating for the reduced activity of the catalyst so that the ethylene feed rate can remain substantially constant. In this way, it is possible to maintain uniformity of properties in the reaction product and hold the polymer concentration in the reactor at the desired level.

Referring now to Figure 2, I have shown a modification of my invention adapted particularly for polymerization when the monomer feed is sufficiently impure to require venting of the vapor phase of the reactor in order to prevent excessive pressures therein. These impurities must be inert, that is, not catalyst poisons, as previously described. All of the elements of this system which are the same as those shown in Figure 1 are designated by the same reference numbers as used in Figure 1. The operation of this embodiment will be described for the polymerization of ethylene.

In this modification, the solvent and catalyst feed rates are maintained constant and the reactor product withdrawal rate is controlled to maintain a constant liquid level in the reactor. As an alternative, the product withdrawal rate can be controlled by a rate of flow controller. The temperature within the reactor is maintained constant. The ethylene feed rate is adjusted in response to pressure changes within the reactor. This reactor pressure acts upon a pressure sensitive element of pressure controller recorder 31 which controls valve 32 in ethylene feed line 29. Ethylene from a high pressure source is passed through a pressure reducer valve 39 which is controlled by pressure controller 40 in response to the pressure in feed conduit 29 upstream of valve 32 and downstream of valve 39. In conduit 29 between valves 32 and 39, flow sensitive element 42 is located in communication with flow recorder 43.

In a polymerization of this type, it is important that the operation of the reactor be stabilized so as to maintain a substantially constant concentration of ethylene in the reaction mixture. This is accomplished in accordance with my invention by controlling the rate of feed introduction so that the reactor pressure remains substantially constant. In a system such as herein described, where there is a great difference in the volatility of the polymerizable organic feed compound and the other components in the reaction mixture, substantially all of the pressure in the vapor phase of the reactor is supplied by the polymerizable compound. Since the concentration of ethylene in the liquid phase is dependent upon the pressure of the ethylene in the vapor phase, it has been found that a substantially constant concentration of ethylene can be maintained in the reaction mixture by supplying the ethylene feed to the reactor at such a rate that a predetermined pressure is maintained therein. Operation in this manner also prevents excessive pressures in the reactor.

In the event that the ethylene feed contains a substantial amount of impurities which will accumulate in the vapor phase of the reactor and cause an increase in pressure therein or, in accordance with the above discussed feature of this invention, a decrease in the ethylene feed rate, it becomes necessary to vent the reactor in order to remove these gaseous impurities. A further modification of this invention is shown in Figure 2 which enables adequate control of such an ethylene polymerization process although substantial amounts of impurities are present in the ethylene feed. Referring to this feature, vent conduit 44 in open communication with the vapor phase of the reactor allows removal of gaseous impurities through control valve 45 which regulates the flow of these gases from the reactor. Ethylene analyzer controller 46 samples the gaseous phase of the reactor, analyzes these gases for ethylene content, and in turn produces an output as a function of the ethylene content. This output is applied to control valve 45 which regulates the vent gas flow. The ethylene analyzer can be of any type suitable, as for example, an analyzer of the type described in U.S. Patent 2,579,825, issued to J. W. Hutchins, December 25, 1951. The use of an instrument of this type does not limit this embodiment to the polymerization of ethylene since such an instrument, an infrared analyzer, mass spectrometer, or the like, can readily be adapted to analyze for any of the polymerizable monomers which are within the scope of this application.

With this vent-gas conduit and the ethylene analyzer in operation in cooperation with the ethylene feed regulator, relatively impure ethylene can be used in this process satisfactorily. In such a case, as the process progresses, gaseous impurities tend to build up in the vapor phase of the reactor and reduce the ethylene content therein. As the ethylene content diminishes, ethylene analyzer controller 46 opens valve 45 which allows removal of these gases from the reactor. This in turn causes a decrease in pressure in the reactor, and pressure controller recorder 31 acting through valve 32 allows an increase in ethylene feed rate to the reactor. Thus, gases having a relatively low concentration of ethylene are vented from the reactor and are replaced by ethylene feed having a relatively high concentration of ethylene. In this manner, the pressure within the reactor and the ethylene concentration in the vapor phase of the reactor are maintained substantially constant.

While the invention has been described in connection with present, preferred embodiments thereof, it is to be understood that this description is illustrative only and is not intended to limit the invention.

I claim:

1. In a liquid phase catalytic polymerization reaction in a pressurized reaction zone carrying a liquid phase and a vapor phase and to which polymerization catalyst and monomer are fed continuously in separate streams, the improvement in controlling said reaction which comprises sensing the pressure in said reaction zone, producing a control signal as a function of said pressure, and applying said control signal to increase the rate at which catalyst is fed to said reaction zone in response to an increase in said pressure and to decrease the rate at which said catalyst is fed to said reaction zone in response to a decrease in said pressure, thereby maintaining said pressure within predetermined limits.

2. In a liquid phase catalytic polymerization reaction in a pressurized reaction zone carrying a liquid phase and a vapor phase and to which polymerization catalyst and monomer are fed continuously in separate streams, the improvement in controlling said reaction which comprises sensing the pressure in said reaction zone, producing a first control signal as a function of said pressure, applying said first control signal to increase the rate at which monomer is fed to said reaction zone in response to a decrease in said pressure and to decrease the rate at which said monomer is fed to said reaction zone in response to an increase in said pressure thereby maintaining said pressure within predetermined limits, sensing the rate of flow of said monomer to said reaction zone, producing a second control signal as a function of said rate of flow, and applying said second control signal to increase the rate at which catalyst is fed to said reaction zone in response to a decrease in said monomer flow rate and to decrease the rate at which said catalyst is fed to said reaction zone in response to an increase in said monomer flow rate thereby maintaining said monomer rate of flow within predetermined limits.

3. The process of claim 2 wherein an inert liquid diluent is introduced to said reaction zone at a substantially constant rate, effluent is removed from said reaction zone at a rate controlled to maintain a substantially constant liquid level in said reaction zone, and the temperature within said reaction zone is maintained substantially constant by controlling the flow of heat exchange fluid in contact therewith.

4. The process of claim 3 wherein said monomer is 1-olefin having no more than 8 carbon atoms per molecule and no branching near the double bond than the 4-position, and said polymerization catalyst is a granular material introduced into said reaction zone as a slurry in diluent.

5. A process according to claim 4 wherein the 1-olefin is ethylene and the catalyst comprises chromium oxide, associated with at least one oxide selected from the group consisting of silica, alumina, zirconia, and thoria.

6. A process according to claim 5 wherein the inert liquid diluent is a hydrocarbon solvent selected from the group consisting of naphthenic and paraffinic hydrocarbons of from 3 to 12 carbon atoms.

7. In a liquid phase polymerization of 1-olefin having no more than 8 carbon atoms per molecule and no branching nearer the doube bond than the 4-position in the presence of a granular polymerization catalyst and an inert liquid diluent in a pressurized reaction zone carrying a liquid phase containing 1-olefin and a vapor phase containing 1-olefin wherein a 1-olefin stream containing small amounts of inert gases is fed continuously to said reaction zone, the improvement in controlling said polymerization which comprises sensing the pressure in said reaction zone, producing a first control signal as a function of said pressure, applying said first control signal to increase the rate at which said 1-olefin stream is fed to said reaction zone in response to a decrease in said pressure and to decrease the rate at which said 1-olefin stream is fed to said reaction zone in response to an increase in said pressure thereby maintaining said pressure within predetermined limits, venting gases from said reaction zone, sensing the 1-olefin content in said vented gases, producing a second control signal as a function of said 1-olefin content, and applying said second control signal to increase the rate of flow of said vented gases from said reaction zone in response to a decrease in said 1-olefin content and to decrease the rate of flow of said vented gases from said reaction zone in response to an increase in said 1-olefin content thereby maintaining said 1-olefin content within predetermined limits.

8. A process according to claim 7 wherein the 1-olefin is ethylene and the catalyst comprises chromium oxide associated with at least one oxide selected from the group consisting of silica, alumina, zirconia and thoria.

9. In polymerization apparatus including a pressurizable reaction vessel adapted for operating with a liquid phase and a vapor phase and a monomer feed line, a catalyst feed line and an effluent line connected to said vessel, the improved control system comprising, in combination, a motor valve in said monomer feed line, a pressure controller operatively connected to said vessel and said motor valve enabling control of vessel pressure by varying monomer feed rate, rate of flow regulating means in said catalyst feed line, rate of flow sensing means in said monomer feed line, and a flow controller operatively connected to said rate of flow regulating means and said rate of flow sensing means enabling control of monomer feed rate by varying catalyst feed rate.

10. In polymerization apparatus including a pressurizable reaction vessel adapted for operating with a liquid phase and a vapor phase and a monomer feed line, a catalyst feed line and an effluent line con[illegible] vessel, the improved control system comprising, [illegible] bination, a first motor valve in said monomer feed [illegible] a pressure controller operatively connected to said vessel and said first motor valve enabling control of vessel pressure by varying monomer feed rate, a vent line communicating with the vapor phase of said reaction vessel, a second motor valve in said vent line, an analyzer controller adapted to analyze for 1-olefin in a gaseous stream and produce a control signal proportional thereto communicating with said vent line, and means for applying said signal to said second motor valve.

References Cited in the file of this patent

UNITED STATES PATENTS

| | | |
|---|---|---|
| 1,309,794 | Brown | July 15, 1919 |
| 1,624,294 | Wallace | Apr. 12, 1927 |
| 2,121,258 | Osterstrom et al. | June 21, 1938 |
| 2,224,071 | Wasserman | Dec. 3, 1940 |
| 2,404,788 | Burke | July 30, 1946 |
| 2,431,485 | Keeling | Nov. 25, 1947 |
| 2,440,822 | Hachmuth | May 4, 1948 |
| 2,497,323 | Roedel | Feb. 14, 1950 |
| 2,497,828 | Young | Feb. 14, 1950 |
| 2,500,197 | Michael | Mar. 14, 1950 |
| 2,546,013 | Peck | Mar. 20, 1951 |
| 2,550,126 | Snow | Apr. 24, 1951 |
| 2,570,056 | Halbig | Oct. 2, 1951 |
| 2,665,197 | Roland | Jan. 5, 1954 |
| 2,709,678 | Berger | May 31, 1955 |
| 2,777,836 | Everard et al. | Jan. 15, 1957 |
| 2,825,721 | Hogan et al. | Mar. 4, 1958 |